United States Patent
Bottomley et al.

(10) Patent No.: US 8,442,169 B2
(45) Date of Patent: May 14, 2013

(54) BLIND SIR ESTIMATION USING SOFT BIT VALUES

(75) Inventors: Gregory E. Bottomley, Cary, NC (US); Anders Rosenqvist, Lund (SE); Andres Reial, Malmö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 749 days.

(21) Appl. No.: 12/709,294

(22) Filed: Feb. 19, 2010

(65) Prior Publication Data

US 2011/0206107 A1 Aug. 25, 2011

(51) Int. Cl.
*H03D 11/04* (2006.01)

(52) U.S. Cl.
USPC ....... 375/348; 375/148; 455/63.1; 455/226.1; 455/296

(58) Field of Classification Search ........ 375/144, 375/148, 340, 346, 348, 349; 455/63.1, 67.11, 455/67.13, 226.1, 226.2, 226.3, 296
See application file for complete search history.

(56) References Cited

U.S. PATENT DOCUMENTS

| | | | |
|---|---|---|---|
| 5,909,465 A | 6/1999 | Bottomley et al. | |
| 2006/0206290 A1* | 9/2006 | Shin et al. | 702/189 |
| 2010/0309810 A1* | 12/2010 | Wachsmann | 370/252 |
| 2011/0206167 A1* | 8/2011 | Rosenqvist et al. | 375/346 |

FOREIGN PATENT DOCUMENTS

| WO | WO 2004/045118 A2 | 5/2004 |
|---|---|---|
| WO | WO 2007/027778 A1 | 3/2007 |

OTHER PUBLICATIONS

Balachandran, K. et al. "Channel Quality Estimation and Rate Adaptation for Cellular Mobile Radio." IEEE Journal on Selected Areas in Communications, vol. 17, No. 7, Jul. 1999, pp. 1244-1256.
Hagenauer, J. et al. "A Viterbi Algorithm with Soft-Decision Outputs and its Applications." IEEE Global Telecommunications Conference, 1989 (GLOBECOM '89), vol. 3, Dallas, TX, US, Nov. 27-30, 1989, pp. 1680-1686.
Higuchi, K. et al. "Experimental Evaluation of Combined Effect of Coherent Rake Combining and SIR-Based Fast Transmit Power Control for Reverse Link of DS-CDMA Mobile Radio." IEEE Journal on Selected Areas in Communications, vol. 18, No. 8, Aug. 2000, pp. 1526-1535.

* cited by examiner

*Primary Examiner* — Dac Ha

(57) ABSTRACT

An SIR estimate of a communication signal in a wireless communication system receiver is calculated based on soft bit values output by a nonlinear detector. The average amplitude of the detector output soft bits is estimated. The average power of the detector output soft bits is estimated, e.g., as a mean-square or variance. An SIR of the communication signal is estimated based on the soft bit amplitude and power estimates. In particular, the SIR is estimated as the ratio of the square of soft bit amplitude to the difference between the mean square soft bit power and the square of soft bit amplitude, or the ratio of the square of soft bit amplitude to the variance. In either case, the SIR estimate may be scaled to obtain the desired units. The communication signal may be a received signal, or a simulated signal generated using channel estimates obtained from, e.g., a pilot channel.

30 Claims, 4 Drawing Sheets

BLIND SIR ESTIMATION USING SOFT BIT VALUES

FIELD OF THE INVENTION

The present invention relates generally to wireless communication system receivers, and in particular to a system and method for blind Signal to Interference Ratio (SIR) estimation using demodulator output soft bit values.

BACKGROUND

Modern wireless communication systems transmit digital data (including digitized voice signals) across an air interface by modulating the data onto an RF carrier. The RF signal is received and processed by a receiver, to recover the data. However, the received signal includes, in addition to the data, interference and noise components that must be quantified (or estimated) and removed. A common measure of signal quality is the Signal to Interference plus Noise Ratio, SINR, (or commonly just SIR). The SIR of each radio channel plays an important role in a receiver.

When the SIR is low, signal quality may be too low for correct reception (even with the use of correctional codes) of the actual digital data stream that is sent over the radio channel, and therefore retransmissions may be needed. When the SIR is high, valuable system resources such as time, radio bandwidth and battery power may be wasted, since it may be too easy to correctly receive the actual digital data stream. In either case, the sender may want to adjust the signal power, any controllable sources of interference, and/or the amount (or rate) of useful data that is sent using given time, frequency, and code resources. In order to successfully perform such adjustments, accurate and responsive estimates of the SIR are useful.

Many approaches to SIR estimation focus on estimating input SIR at the input to the demodulator. For example, SIR is often estimated using so-called pilot symbols, which are known data symbols that are transmitted over the air on the actual radio channel. The receiver may compare its received pilot symbols with the known data symbols, interpret the differences as interference plus noise, and calculate an estimated SIR. Such an approach does not account for the fact that some of the interference will be removed by the demodulator, particularly when the demodulator performs channel equalization.

A more useful measure of performance is output SIR, at the output of the demodulator. The better the demodulator is, the higher the SIR estimate.

Much effort has been focused on output SIR estimation for linear demodulation, such as Rake reception or linear equalization, using soft data symbol estimates to estimate SIR. A soft data symbol is where estimated data symbols may be quantized at more levels than there are symbols in the alphabet being used, with the value of the estimated data symbol indicating the degree of confidence that the estimate is correct. For one example of using soft data symbol estimates to estimate SIR, see the paper by K. Higuchi et al., "Experimental evaluation of combined effect of coherent Rake combining and SIR-based fast transmit power control for reverse link of DS-CDMA mobile radio," published in the IEEE J. Selected Areas Commun., vol. 18, pp. 1526-1535, August 2000, the disclosure of which is incorporated herein by reference in its entirety. Using soft data symbol estimates to estimate SIR involves three steps: modulation removal using detected symbols; estimating a mean then squaring to obtain signal power; and estimating a variance to obtain impairment power.

Recently, such approaches have been extended to operate on soft bit estimates. See co-pending U.S. patent application Ser. No. 12/709,239, titled "Data-aided SIR estimation," by Rosenqvist, et al., filed concurrently herewith, assigned to the assignee of the present application, and incorporated herein by reference in its entirety. A soft bit value is an integer than indicates both the probable value of a demodulated bit (e.g., zero or one), and additionally an indication of the confidence or probability that the bit has that value. For example, a soft bit may be a positive or negative numerical value, with the sign of the value indicating the digital bit value, and the magnitude of the value indicating the probability that the indicated sign is correct.

Better demodulation performance can be obtained by non-linear equalization. In particular, Maximum Likelihood Detection (MLD) methods, including Maximum Likelihood Sequence Detection (MLSD), are optimal in the sense that they minimize symbol block or symbol sequence error rate. However, such approaches typically produce hard symbol estimates. Soft bit values are also generated using approaches such as Soft Output Viterbi Algorithm (SOVA), as described by J. Hagenauer and P. Hoeher in the paper, "A Viterbi algorithm with soft-decision outputs and its applications," published in Proc. IEEE Globecom, Dallas, Tex., 1989, pp. 1680-1686, the disclosure of which is incorporated herein by reference in its entirety.

In the past, SIR estimation for MLSD was based on estimating signal plus impairment power by estimating received signal power, then estimating impairment power using the branch metrics in the MLSD demodulation process. In U.S. Pat. No. 5,909,465, titled, "Method and apparatus for bidirectional demodulation of digitally modulated signals," by Bottomley, et al., the disclosure of which is incorporated herein by reference in its entirety, the SIR estimate is used to determine a direction of demodulation. In this approach, SIR estimation must be built into the demodulator. Also, because of decision errors, the impairment power estimate is biased low.

Another approach to SIR estimation for MLSD takes advantage of forward error correction (FEC) decoding, as described by K. Balachandran, et al. in the paper, "Channel quality estimation and rate adaptation for cellular mobile radio," published in the IEEE J. Selected Areas Commun., vol. 17, pp. 1244-1256, July 1999, the disclosure of which is incorporated herein by reference in its entirety. The decoded information bits are re-encoded, re-modulated, and channel filtered to obtain an ideal received signal. This ideal signal is subtracted from the actual received signal to form impairment values, which are squared and averaged to obtain an impairment power. With this approach, regeneration requires successful decoding, some delay, possible extra hardware, and/or more battery power.

SUMMARY

According to one or more embodiments disclosed and claimed herein, soft bit value outputs from a nonlinear detector are used to calculate an SIR estimate. The embodiments do not assume an amplitude reference is available. For example, in maximum likelihood detection, there is no notion of a symbol decision variable and associated amplitude reference. Rather, an implicit amplitude reference is estimated from the soft bit values. Additionally, an impairment power is estimated by taking the magnitude of the soft bit values and estimating a sample mean and variance. The calculations are performed on soft bit values, not soft symbol estimates.

One embodiment relates to a method of estimating an SIR of a communication signal in a wireless communication system receiver. The receiver obtains a communication signal. The communication signal is processed in a detector operative to output soft bit values. The average amplitude of the detector output soft bits is estimated. The average power of the detector output soft bits is estimated. An SIR of the communication signal is estimated based on the soft bit amplitude and power estimates.

Another embodiment relates to a receiver operative in a wireless communication system. The receiver includes one or more antenna operative to receive a transmitted communication signal, and a front-end processing circuit operative to process a signal received from an antenna and convert the signal to baseband. The receiver also includes a baseband processor. The baseband processor includes a nonlinear, Maximum-Likelihood detector operative to receive a communication signal and output soft bit values; an amplitude estimator operative to estimate the average amplitude of soft bit values from the detector; and a power estimator operative to estimate the average power of soft bit values from the detector. The baseband processor also includes an SIR calculator operative to estimate the SIR of a communication signal based on the estimated average amplitude and estimated average power of soft bit values from the detector. The baseband processor further includes a decoder operative to receive soft bit values from the detector and decode data in the communication signal.

DETAILED DESCRIPTION

Figure 1:
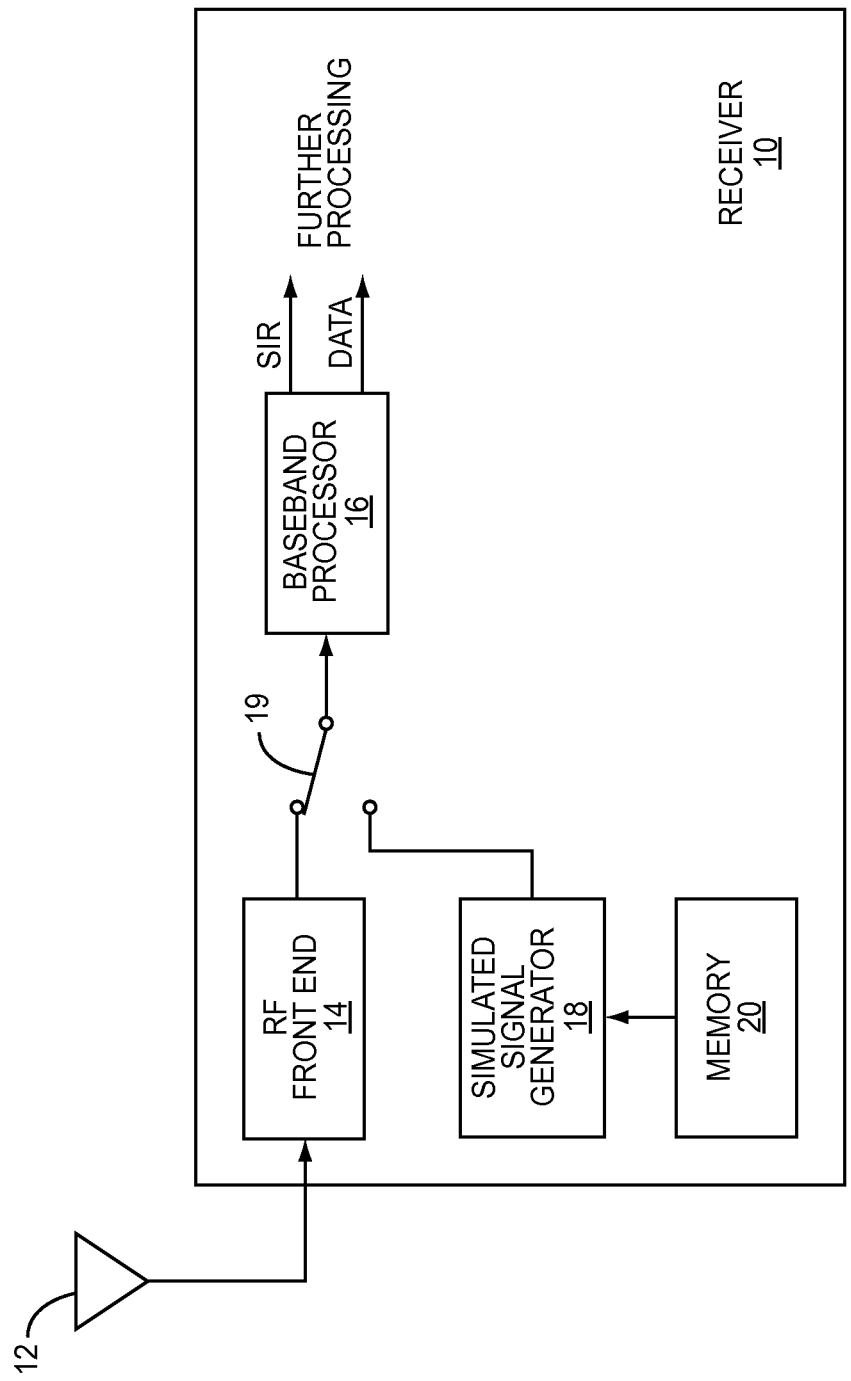
FIG. 1 is a functional block diagram of portions of a wireless communication system receiver.

FIG. 1 depicts the relevant portions of a representative wireless communication system receiver 10, which may reside in a fixed network base station (Access Point), or a mobile terminal (User Equipment). The receiver 10 includes one or more antennas 12, RF front end circuit 14, and baseband processor 16. A transmitted communication signal is received at the antenna 12, and is processed by a Radio Frequency (RF) front end circuit 14. The RF front end processing may include low-noise amplification, filtering, mixing, sampling, digitization, and the like. The RF front end circuit 14 outputs a baseband communication signal, which is processed by the baseband processor 16 to generate at least an SIR estimate and recover information bits, or data. The receiver 10 may optionally include a simulated signal generator 18 and memory 20, as depicted in the embodiment of FIG. 1. If the simulated signal generator 18 is included, a switching function 19 selects one of a communication signal from the RF front end circuit 14, and the simulated signal from the simulated signal generator 18, for processing by the baseband processor 16.

In one embodiment, as described more fully herein, a communication signal may be optionally generated by the simulated signal generator 18, which may retrieve certain precomputed information from memory 20.

Figure 2:
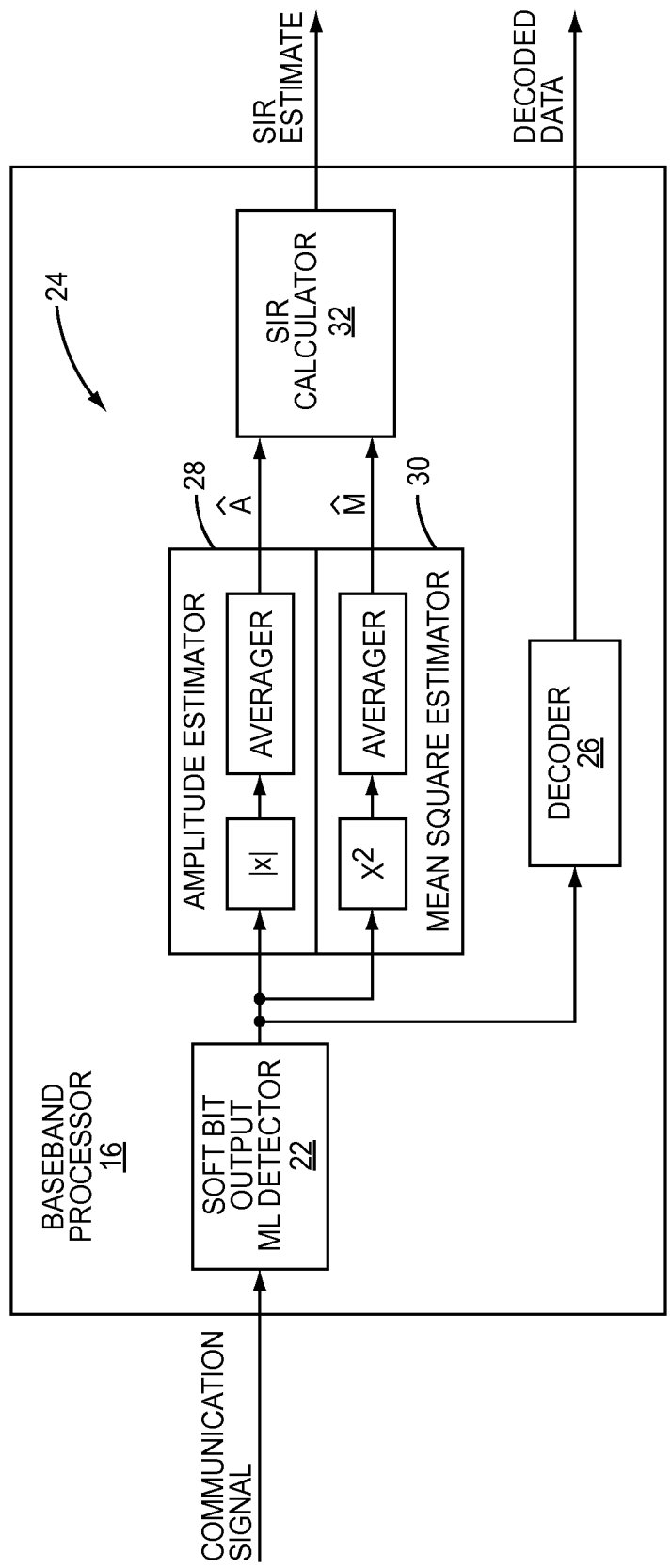
FIG. 2 is a functional block diagram of the baseband processor of FIG. 1.

FIG. 2 depicts the baseband processor 16 in greater detail. The baseband processor 16 includes a soft-output detector 22, SIR estimator, indicated generally at 24, and a decoder 26. The communication signal (either a baseband signal from the RF front end circuit 14 or a signal constructed by the simulated signal generator 18) is provided to the soft bit output, nonlinear, Maximum Likelihood (ML) based detector 22. This detector produces soft bit values, which are provided to the SIR estimator 24 and the decoder 26. The decoder 26 produces recovered information bits, or data.

The SIR estimator 24 includes an amplitude estimator 28, a mean-square (MS) estimator 30, and an SIR calculator 32. The amplitude estimator 28 is operative to take the magnitude of the (absolute value of) soft bit values and average the result, indicated by $\hat{A}$. The MS estimator 30 is operative to square the soft bit values and average the result, indicated by $\hat{M}$. The amplitude $\hat{A}$ and MS estimates $\hat{M}$ are provided to the SIR calculator 32 to produce an initial estimate of the SIR of the communication signal.

The SIR calculator 32 can calculate the SIR in linear units as $$SIR_{est} = K \frac{\hat{A}^2}{\hat{M} - \hat{A}^2} \quad (1a)$$

where K is a known (predetermined) scaling factor to obtain the necessary units.

In one embodiment, the MS estimator 30 can be replaced by a variance estimator. In this case, the amplitude estimate $\hat{A}$ is subtracted from the soft bit magnitudes $\hat{M}$, and the result is squared and averaged. If a variance estimator is used to produce variance estimate $\hat{V}$, then the SIR is estimated using $$SIR_{est} = K \frac{\hat{A}^2}{\hat{V}} \quad (1b)$$

Mean-square estimation and variance estimation are special cases of power estimation. An alternative method of power estimation is to calculate the sample mean absolute deviation (L1-norm), as described more fully below.

Figure 3:
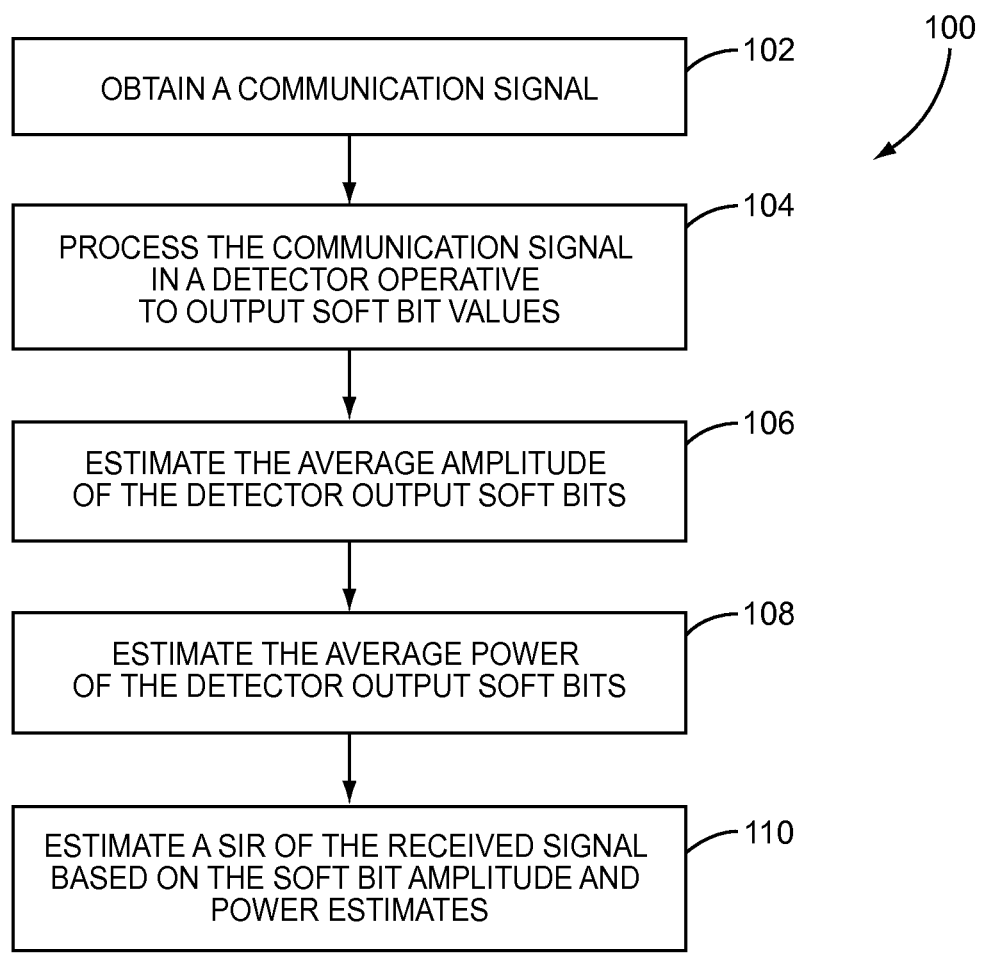
FIG. 3 is a flow diagram of a method of estimating SIR in a wireless communication system receiver.

FIG. 3 depicts a method 100 of estimating an SIR of a communication signal in a wireless communication system receiver, such as in a baseband processor 16. The baseband processor 16 obtains a communication signal (block 102). The communication signal may comprise a baseband signal downconverted from a received RF signal by an RF front end circuit 14, or may comprise a signal generated by a simulated signal generator 18. The communication signal is processed in a detector 22 operative to output soft bit values (block 104), such as an ML-based detector 22. The average amplitude of the detector 22 output soft bits is estimated (block 106), and the average power of the detector 22 output soft bits is also estimated (block 108), e.g., as a mean-square estimate or a variance estimate. Although FIG. 3 depicts these two steps (blocks 106 and 108) sequentially, those of skill in the art will readily recognize that their order may be reversed, or that they may be performed simultaneously. Finally, an estimated SIR of the communication signal is calculated, based on the soft bit amplitude and power estimates (block 110). This calculation may implement, e.g., equations (1a) or (1b).

Some embodiments of the receiver 10 include a simulated signal generator 18 operative to generate a communication signal for the baseband processor 16, e.g., in the absence of a suitable transmitted RF signal to be received by the antenna 12. For example, a UE may experience conditions in which there is no data traffic in the wireless network. In this case, the detector 22 would not output any soft bits, and hence the SIR calculator 24 would be unable to estimate SIR. However, even under such conditions, it is beneficial for the UE to signal an estimated SIR to the network. In this case, according to one embodiment, the receiver 10 generates an estimate of channel quality from the pilot channel (on which pilot symbols are transmitted), and simulates data traffic. The detector 22 and SIR calculator 24 are then employed to estimate an SIR in the absence of data traffic.

In particular, in one embodiment, a noiseless transmitted signal is generated in the simulated signal generator 18 by generating random symbol values, and applying modulation and pulse shaping. In one embodiment, this is done in advance, and stored in a table in memory 20. Channel estimates are generated, e.g., from the pilot channel, and the noiseless transmitted signal is filtered using the channel estimates to generate a noiseless received signal. A normalized noise signal is generated using Gaussian number generator. In one embodiment, the normalized noise signal is generated in advance and stored in the memory 20. A noise signal is obtained by scaling the normalized noise signal by an estimated noise standard deviation (e.g., the square root of estimated noise power). A simulated communication signal is then generated by adding the noise signal to the noiseless received signal. This communication signal is provided to the baseband processor 16, in lieu of a baseband communication signal from the RF front end circuit 14.

Conventionally, to simulate the communication signal, one needs to know the signal SINR—the very quantity to be estimated. However, according to embodiments of the present invention, only the input SINR is required. By demodulating the simulated communication signal in the detector 22, the output SINR may be estimated by the SIR estimator 24. This technique captures the ability of the detector 22 to suppress noise and interference. The simulated signal generator 18 only requires channel and noise power estimates. These can be obtained, as stated above, using conventional techniques applied to other transmitted signals, such as a pilot channel. Alternatively, a past set of data may be used. When using past data, channel prediction can be applied.

Sometimes, the SIR of a reference pilot or control signal is needed. Once the output SIR of the traffic or data channel is estimated, it can be translated to an SIR level for the reference channel using a known or estimated relation between the two.

The SIR estimate may include bias from a number of sources. For example, one source is the finite number of soft bits used to estimate the impairment power. If N is the number of values used, then the SIR estimate can be scaled by $(N-1)/N$.

The main source of bias is decision error. When the magnitude of the soft bit values is taken, it implies that the sign of the soft bit value was the same as the sign of the true bit value. At low SIR, this is often not the case. As a result, the amplitude estimate is biased, leading to a bias in the SIR estimate.

Figure 4:
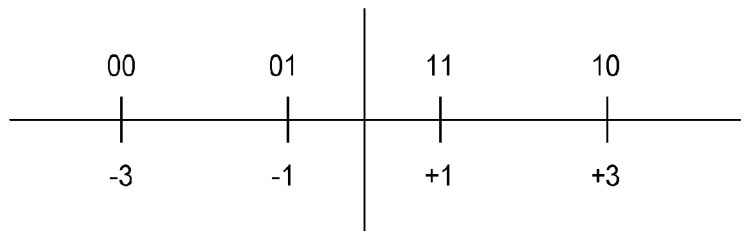
FIG. 4 is a diagram of the mapping of bits to signal values.

The bias depends on the modulation and which soft bits are used. The following example is provided for illustrative purposes. Consider Gray-coded 16-QAM. In this case, two bits are sent on the in-phase carrier (I) and two bits are sent on the quadrature carrier (Q). Each pair of bits is mapped to one of four signal values: $-3, -1, 1$ and $3$ similar to 4-ASK as shown in FIG. 4. For the least significant bit (LSB)—that is, the second bit listed—the bit takes on one value for symbols $-3, +3$ and another value for symbols $-1, +1$.

Through analysis, the true SIR may be related to the estimated SIR with a formula. This formula can then be used to generate a table. Bias is removed by looking up an estimated SIR value in the table, and reading off the corresponding true SIR value. Interpolation, such as linear interpolation, can be used for values not in the table. Interpolation can be done before or after unit conversion. Here interpolation is considered in the linear domain, as opposed to the dB domain.

A bias removal table may be generated as follows. First, it is determined how estimated quantities are related to true quantities. This can be done by examining how a linear detector would compute a soft bit value from a soft symbol value. The linear detector soft estimate of the 4-ASK symbol on the I component can be modeled as $$r_I = C s_I + n \quad (2)$$

where C is the amplitude before soft information generation, $s_I$ is the 4-ASK symbol ($-3, -1, 1$ or $3$) and n is Gaussian noise with zero mean and variance $\sigma^2$. The true SIR, expressed as energy-per-symbol $E_s$ divided by one-sided noise power spectral density $N_0$ is given by $$SIR = \frac{E_S}{N_0} = \frac{5C^2}{\sigma^2} \quad (3)$$

The soft value bit value for the LSB is modeled as $$x = A\left(-2 + \frac{|r_I|}{C}\right) \quad (4)$$

For a linear detector, A should be known, and the data-aided approach described in the concurrently filed, co-pending patent application by Rosenqvist, et al. (cited above) can be used. However, at the output of the nonlinear demodulator, such an assumption is not valid. Accordingly, in practice, the amplitude A must be estimated. For the analysis, to derive the bias, assume A=1. Taking the magnitude of x, gives $$z = |x| \quad (5)$$

From the model of $r_I$ and the expression for x, one can determine how the SIR estimate using the present invention is related to the true SIR value. Specifically, assuming $s_I = B/C$ was transmitted, the amplitude estimate $\hat{A}$ can be expressed as $$\hat{A} = E\{z\} = \int_{-\infty}^{\infty} \frac{|-2 + |r_I|/C|}{\sigma\sqrt{2\pi}} \exp\left(\frac{-(r_I - B)^2}{2\sigma^2}\right) dr_I \quad (6)$$

The MS estimate $\hat{M}$ can be expressed as $$\hat{M} = E\{x^2\} = 4 - 4\hat{A} + 4(B^2/C^2 + \sigma^2/C^2) \quad (7)$$

The expressions in equations (6) and (7) are conditional estimates, conditioned on what was transmitted. These can be averaged over the possible transmitted values. This yields $$\hat{A} = 1 - 0.5\mathrm{erfc}(\sqrt{R}) - 2.5\mathrm{erfc}(5\sqrt{R}) + \frac{1}{2\sqrt{R\pi}}\left[\begin{array}{c}\exp(-R) + \\ \exp(-25R)\end{array}\right] \quad (8)$$

and

-continued $$\hat{M} = 1 + 2/R + 2\mathrm{erfc}(\sqrt{R}) - 6\mathrm{erfc}(3\sqrt{R}) - \frac{2}{\sqrt{R\pi}}\begin{bmatrix} \exp(-R) + \\ \exp(-9R) \end{bmatrix} \quad (9)$$

where $$R = \frac{A^2}{2\sigma^2}. \quad (10)$$

Figure 5:
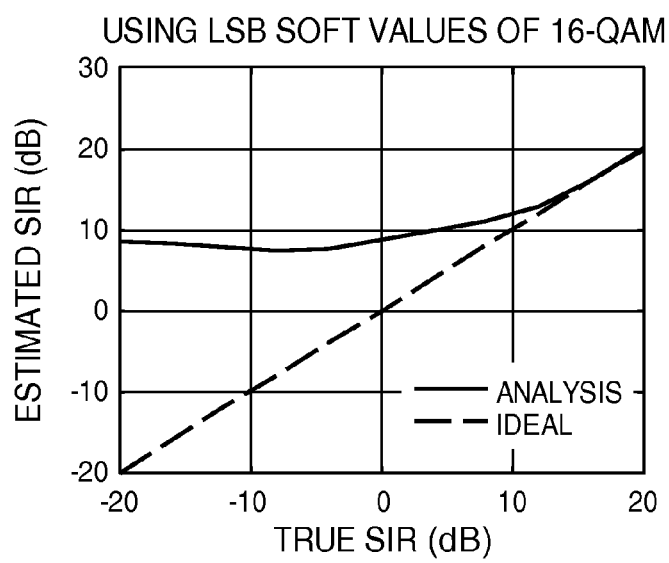
FIG. 5 is a graph of estimated SIR as a function of true SIR.

Substituting equations (8) and (9) into equation (1) and using equation (3) yields the estimated SIR as a function of the true SIR. This is plotted in FIG. 5. A table of values is generated and used to obtain the inverse function. Notice that values below about SIR=−5 dB give the same values as values above −5 dB. To handle this, the assumption is that this approach is only used for SIR above −5 dB. Another solution would be to use the MSB in this region instead of, or in addition to, the LSB.

Alternatively, a bias removal table may be prepared via off-line simulations. This may be useful if any practical imperfections need to be accounted for, e.g., affecting the Gaussian characteristics of the soft values.

The above example demonstrates one way in which bias can be determined and corrected. However, the present invention is not limited to 16-QAM, or using the LSB. Using other bits and other modulations for bias detection and removal are within the scope of the present invention.

Figure 6:
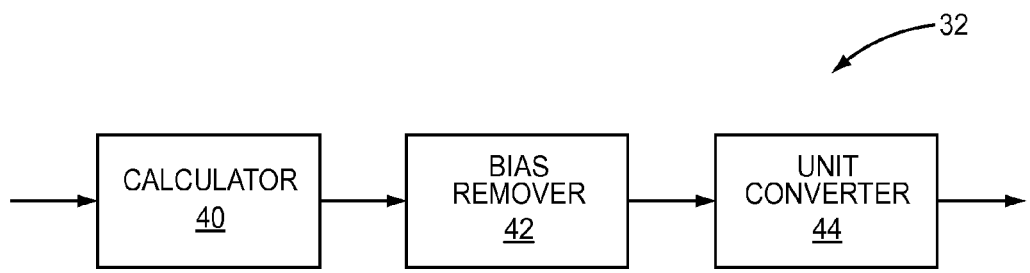
FIG. 6 is a functional block diagram of one embodiment of the SIR calculator of FIG. 2.

FIG. 6 depicts one embodiment of the SIR calculator 32, including a calculator 40, bias remover 42, and unit converter 44. The calculator 40 may implement, e.g., equations (1a) or (1b). The bias remover 42 may operate as described above, to determine and correct bias in the SIR estimate calculated by the calculator 40. The unit converter 44 may covert the SIR estimate to any convenient unit, e.g., dB, as desired or required.

Both mean-square and variance are quadratic measures of noise. However, the present invention is not limited to the use of either MS or variance. For example, instead of calculating a sample variance of the absolute values of soft bits, it is possible to use the sample mean absolute deviation (L1-norm) of the absolute values from the mean of the absolute values. The L1-norm may be more robust to outliers in data/noise and may have another operating range (in terms of output SIR). The bias expression/table when using the L1-norm will be different from the one using variance.

According to embodiments of the present invention, an SIR may be estimated using the soft bit output of a detector, such as a maximum likelihood detector, without the need to design SIR estimation into the detector, which may complicate the design. When applied to other detectors, including linear detectors, embodiments of the present invention provide a robust design independent of scaling that occurs upstream in the receiver signal processing chain. Furthermore, an SIR may be obtained in the absence of traffic on data channels. The bias in the SIR estimate may be determined and removed, increasing the SIR estimate accuracy.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of estimating a Signal to Interference Ratio (SIR) of a communication signal in a wireless communication system receiver, comprising:
   obtaining a communication signal;
   processing the communication signal in a detector operative to output soft bits;
   estimating the average amplitude of the detector output soft bits;
   estimating the average power of the detector output soft bits;
   estimating a SIR of the communication signal based on the soft bit amplitude and power estimates.

2. The method of claim 1 wherein estimating the SIR further comprises scaling the ratio to express the SIR in predetermined units.

3. The method of claim 1 wherein estimating the average power of the detector output soft bits comprises estimating the mean square of the detector output soft bits.

4. The method of claim 3 wherein estimating a SIR of the communication signal based on the soft bit amplitude and power estimates comprises estimating the SIR as ratio of the square of soft bit amplitude to the difference between the mean square soft bit power and the square of soft bit amplitude.

5. The method of claim 4 wherein the SIR is calculated as $$SIR_{est} = K\frac{\hat{A}^2}{\hat{M} - \hat{A}^2}$$

where
   $\hat{A}$ is the estimated average detector output soft bit amplitude;
   $\hat{M}$ is the estimated mean-square detector output soft bit power; and
   K is a scaling factor to express $SIR_{est}$ in predetermined units.

6. The method of claim 2 wherein estimating the average power of the detector output soft bits comprises estimating the variance of the detector output soft bits.

7. The method of claim 6 wherein estimating a SIR of the communication signal based on the soft bit amplitude and power estimates comprises estimating the SIR as ratio of the square of soft bit amplitude to the soft bit variance.

8. The method of claim 7 wherein the SIR is calculated as $$SIR_{est} = K\frac{\hat{A}^2}{\hat{V}}$$

where
   $\hat{A}$ is the estimated average detector output soft bit amplitude;
   $\hat{V}$ is the estimated soft bit variance; and
   K is a scaling factor to express $SIR_{est}$ in predetermined units.

9. The method of claim 1 wherein estimating the average power of the detector output soft bits comprises:
   calculating the mean of the absolute values of the detector output soft bits; and
   calculating the mean absolute deviation (L1-norm) of the absolute values of the detector output soft bits from the mean of the absolute values of the detector output soft bits.

10. The method of claim 1 wherein processing the communication signal in a detector operative to output soft bits comprises processing the communication signal in a nonlinear Maximum Likelihood (ML) detector operative to output soft bits.

11. The method of claim 1 wherein the communication signal is received on a data channel, and further comprising estimating a SIR for a non-data channel by scaling the SIR of the communication signal by a translation factor.

12. The method of claim 11 further comprising estimating the translation factor.

13. The method of claim 11 wherein the translation factor is predetermined.

14. The method of claim 11 wherein the non-data channel comprises a pilot channel.

15. The method of claim 11 wherein the non-data channel comprises a control channel.

16. The method of claim 1 further comprising processing the estimated SIR to remove bias.

17. The method of claim 16 wherein processing the estimated SIR to remove bias comprises:
providing a bias correction table generated using a formula relating true SIR to the estimated SIR; and
indexing the bias correction table with estimated SIR values to obtain corresponding true SIR values.

18. The method of claim 17 wherein processing the estimated SIR to remove bias further comprises interpolating bias correction table true SIR values for corresponding estimated SIR values not in the table.

19. The method of claim 1 wherein obtaining a communication signal comprises:
receiving a transmitted communication signal; and
front-end processing the received signal to generate a baseband communication signal.

20. The method of claim 1 wherein obtaining a communication signal comprises:
generating a noiseless transmitted communication signal by
generating random symbol values, and
applying modulation and pulse shaping to the random symbol values;
generating a noiseless received communication signal by
obtaining data channel estimates, and
filtering the noiseless transmitted communication signal with the channel estimates;
generating noise signal by
generating a normalized noise signal using a Gaussian number generator, and
scaling the normalized noise signal by an estimated noise standard deviation; and
generating a communication signal by adding the noiseless received communication signal and the noise signal.

21. The method of claim 20 wherein one or both of the noiseless transmitted communication signal and the normalized noise signal are generated in advance and stored.

22. A receiver operative in a wireless communication system, comprising:
one or more antenna operative to receive a transmitted communication signal;
a front-end processing circuit operative to process a signal received from an antenna and convert the signal to baseband; and
a baseband processor comprising
a nonlinear, Maximum-Likelihood detector operative to receive a communication signal and output soft bits;
an amplitude estimator operative to estimate the average amplitude of soft bits from the detector;
a power estimator operative to estimate the average power of soft bits from the detector; and
a Signal to Interference Ratio (SIR) calculator operative to estimate the SIR of a communication signal based on the estimated average amplitude and estimated average power of soft bits from the detector; and
a decoder operative to receive soft bits from the detector and decode data in the communication signal.

23. The receiver of claim 22 wherein the SIR calculator estimates the SIR by further scaling the ratio to express the SIR in predetermined units.

24. The receiver of claim 22 wherein the power estimator estimates the average power of soft bits from the detector as the mean square of the soft bits.

25. The receiver of claim 24 wherein the SIR calculator estimates the SIR by calculating a ratio of the square of the soft bit amplitude to the difference between the mean square soft bit power and the square of soft bit amplitude.

26. The receiver of claim 22 wherein the power estimator estimates the average power of soft bits from the detector as the variance of the soft bits.

27. The receiver of claim 26 wherein the SIR calculator estimates the SIR by calculating a ratio of the square of the soft bit amplitude to the soft bit variance.

28. The receiver of claim 22 wherein the detector receives a baseband communication signal from the front-end processing circuit.

29. The receiver of claim 22 further comprising
a simulated signal generator operative to generate a simulated communication signal, and provide the simulated communication signal to the baseband processor.

30. The receiver of claim 29 further comprising
memory operative to store and retrieve data;
wherein the simulated signal generator is operative to retrieve predetermined information from the memory in generating the simulated communication signal.

* * * * *

UNITED STATES PATENT AND TRADEMARK OFFICE
CERTIFICATE OF CORRECTION

PATENT NO. : 8,442,169 B2  Page 1 of 1
APPLICATION NO. : 12/709294
DATED : May 14, 2013
INVENTOR(S) : Bottomley et al.

It is certified that error appears in the above-identified patent and that said Letters Patent is hereby corrected as shown below:

In the Specifications:

In Column 5, Lines 7-8, delete "SIR calculator 24" and insert -- SIR calculator 32 --, therefor.

In Column 5, Line 14, delete "SIR calculator 24" and insert -- SIR calculator 32 --, therefor.

In Column 6, Line 30, delete "soft value bit value" and insert -- soft bit value --, therefor.

In the Claims:

In Column 8, Line 11, in Claim 1, delete "bits;" and insert -- bits; and --, therefor.

Signed and Sealed this
Thirteenth Day of August, 2013

Teresa Stanek Rea
*Acting Director of the United States Patent and Trademark Office*